United States Patent [19]

Hanzawa

[11] Patent Number: 5,341,239
[45] Date of Patent: Aug. 23, 1994

[54] STEREOMICROSCOPE EQUIPPED WITH EYEPIECE INCLUDING VARIABLE MAGNIFICATION OPTICAL SYSTEM

[75] Inventor: Toyoharu Hanzawa, Fuchu, Japan

[73] Assignee: Olympus Optical Co., Ltd., Tokyo, Japan

[21] Appl. No.: 960,834

[22] Filed: Oct. 14, 1992

[30] Foreign Application Priority Data

Oct. 16, 1991 [JP] Japan .................................. 3-267694

[51] Int. Cl.$^5$ ............................................. G02B 21/22
[52] U.S. Cl. .................................... 359/377; 359/380; 359/644
[58] Field of Search ............... 359/375, 376, 377, 380, 359/644, 687

[56] References Cited

U.S. PATENT DOCUMENTS

| 4,671,628 | 6/1987 | Wirz et al. ................... 359/376 X |
| 5,009,487 | 4/1991 | Reiner ............................ 359/376 |
| 5,191,470 | 3/1993 | Wickholm et al. ........... 359/375 X |
| 5,227,914 | 7/1993 | Hanzawa et al. ............... 359/377 X |

Primary Examiner—Edward K. Look
Assistant Examiner—Michael S. Lee
Attorney, Agent, or Firm—Cushman, Darby & Cushman

[57] ABSTRACT

A stereomicroscope includes an objective lens for converting light from an object into parallel beams, an imaging lens for forming an image of the object, a prism for erecting the object image, and an eyepiece for observing the object image so that the object image is viewed stereoscopically through the eyepiece, in which the eyepiece is constructed from a single lens system equipped with a variable magnification optical system and an eye lens whose diameter is larger than a viewer's interpupil distance, and optical paths from the object image to the viewer's eyes traverse the positions outside the optical axis of the eyepiece. Thus, the stereomicroscope dispenses with the need for adjustment of the interpupil distance, causes the freedom of the eyepoint to be increased, and allows a viewer to observe the image from any direction whatsoever.

5 Claims, 5 Drawing Sheets

STEREOMICROSCOPE EQUIPPED WITH EYEPIECE INCLUDING VARIABLE MAGNIFICATION OPTICAL SYSTEM

BACKGROUND OF THE INVENTION

1. Field of the Invention

This invention relates to a stereomicroscope capable of varying magnification.

2. Description of the Prior Art

A stereomicroscope which enables microscopic parts to be viewed stereoscopically is widely used for measurement during the performance of precision machining in the manufacturing industry and for making accurate observations of affected parts, increasing the securing of operations, and enhancing the safety of patients in the medical industry. A conventional stereomicroscopic, however, has the problem that since a viewer's posture for observation, namely, the position of a viewer's eyes (which is hereinafter referred to as "eyepoint") where the viewer observes an image through the microscope, is restricted because of the structure of the stereomicroscope, the image will disappear from view with a slight change of the posture. Consequently, when such a stereomicroscope is used to work over a period of long hours, a viewer must pay attention to his posture for observation in such a manner that the eyepoint is not moved during the work, and thus fatigue is increased.

To lessen such fatigue, an optical arrangement is proposed that, as set forth, for example, in U.S. Pat. No. 4,671,628 (see FIG. 1), the distance between rays of light for observation 2 and 2' emerging from an objective lens 1 is increased and adjusted by movable mirrors 3 and 3' and a fixed mirror 4 so that the distance between the exit pupils at an eyepiece 5 can be controlled with great ease and a field lens 7 is disposed to make the distance between the exit pupils larger than that between the eyes of a viewer 6 for easy observation.

This arrangement, however, needs a proper adjustment for the distance between the exit pupils to obtain a fair image whenever the viewer changes, and does not enable the viewer to change the eyepoint at will in a direction of easy observation during the observation because the eyepoint is restricted.

Hence, it has the problem that, when precision work is carried out over a long time, notably, in turn by a plurality of viewers, the distance between the exit pupils, the direction of observation, and the eyepoint must be finely adjusted and corrected to the viewer's own liking, with resultant complicated operation. Further, there is another problem that its complicated structure makes the working position far from the eyepoint, thus reducing work efficiency.

SUMMARY OF THE INVENTION

It is, therefore, an object of the present invention to provide a stereomicroscope which allows a viewer to make observation from any direction whatever and the eyepoint to be located adjacent to the working position and is excellent in work efficiency.

This object is attained, according to the present invention, by the arrangement that an eyepiece is equipped with an eye lens and a variable magnification optical system and constructed from a single lens system common to the viewer's eyes, and the diameter of the eye lens is larger than the viewer's interpupil distance.

According to the present invention, the diameter of the eye lens is larger than the viewer's interpupil distance, thus doing away with the need for adjustment to the viewer's interpupil distance. Further, by increasing the pupil diameter, an image can surely be observed even though the eyepoint is arbitrarily shifted. Because the eyepiece is provided with the variable magnification optical system, the overall length of an objective optical system is reduced and the eyepoint can be made closer to the working position, with the result that work efficiency can be improved.

This and other objects as well as the features and advantages of the present invention will become apparent from the following detailed description of the preferred embodiments when taken in conjunction with the accompanying drawings.

DETAILED DESCRIPTION OF THE INVENTION

Figure 1:
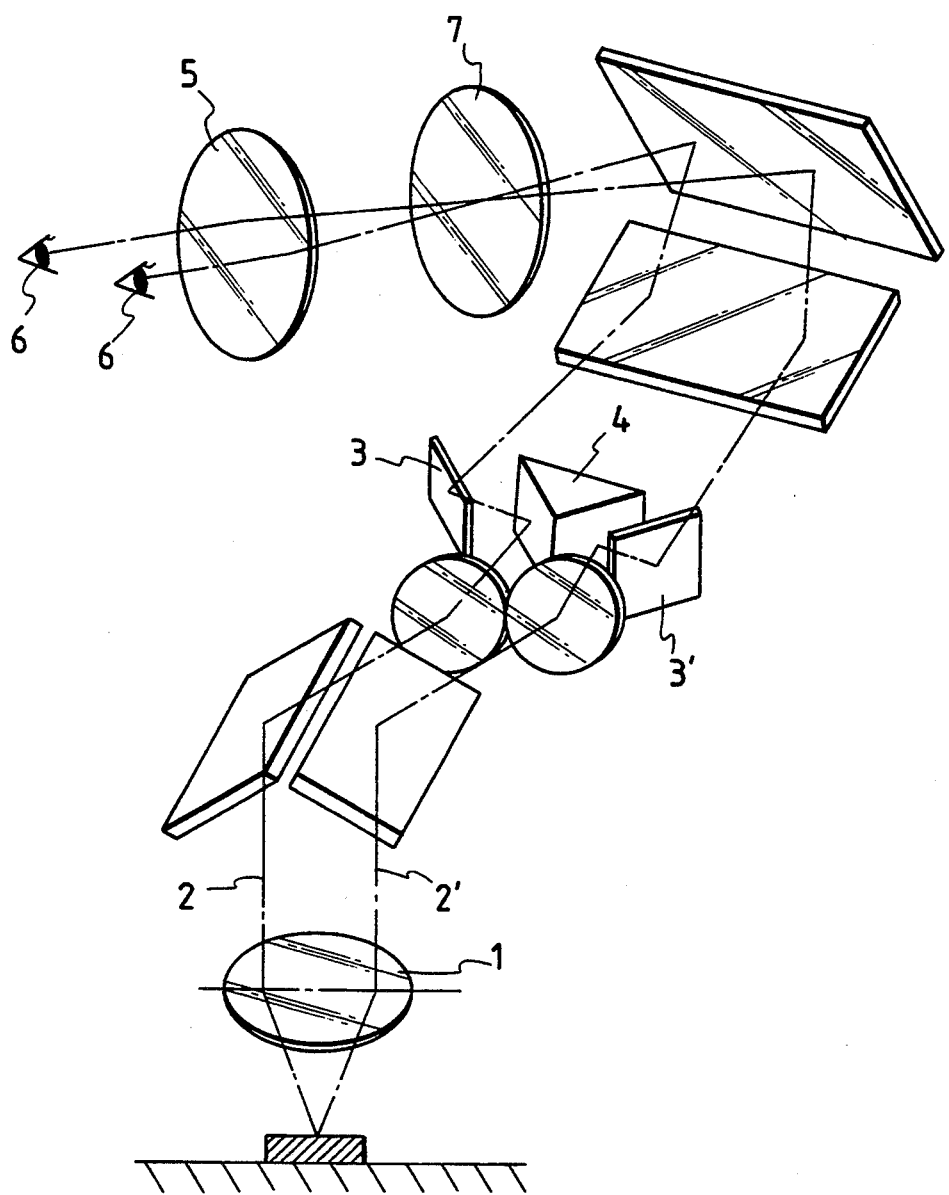
FIG. 1 is a diagrammatic view showing the arrangement of a conventional stereomicroscope.

In accordance with the embodiments shown in the drawings, the present invention will be described in detail below.

Figure 2:
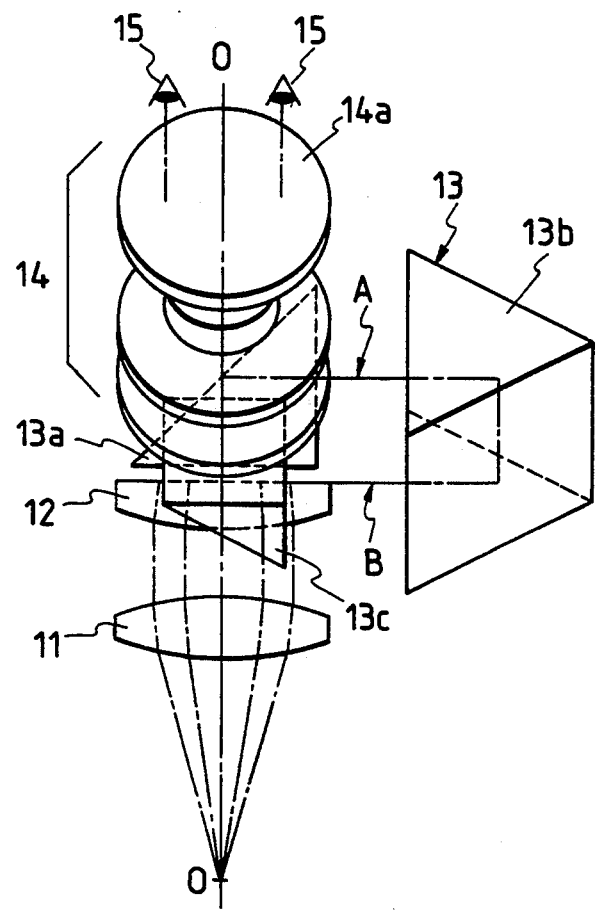
FIG. 2 is a front view showing the optical system of a first embodiment of the stereomicroscope according to the present invention.
Figure 3:
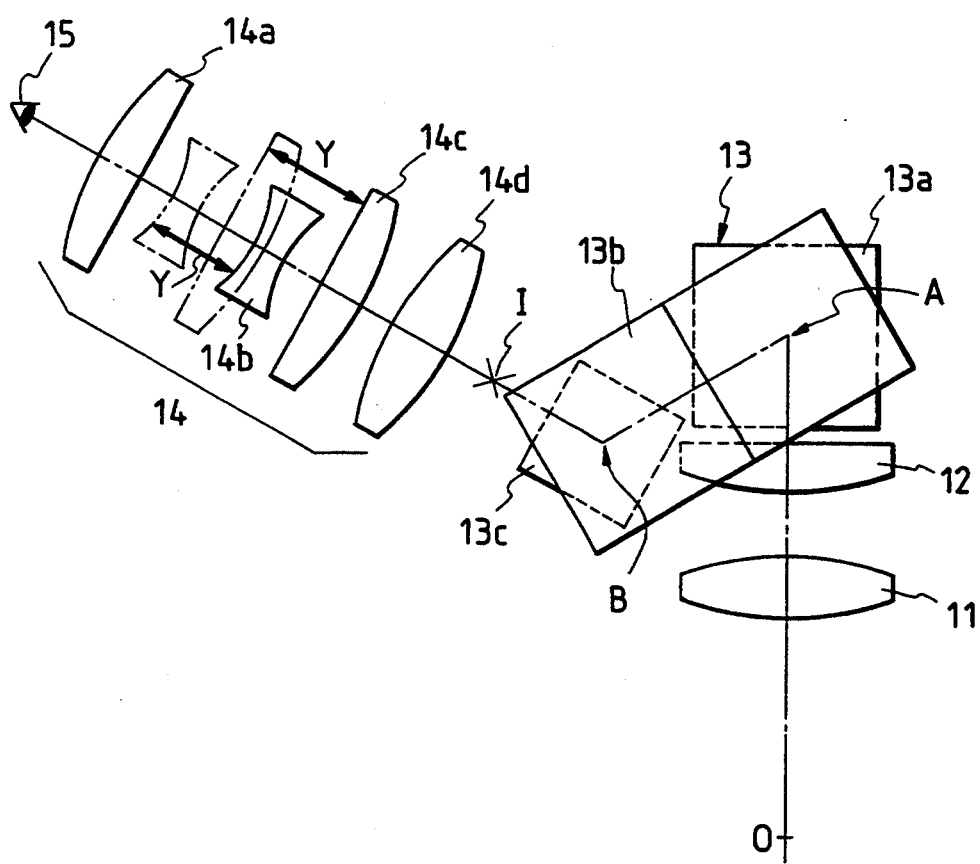
FIG. 3 is a side view showing the optical system of the first embodiment.

FIGS. 2 and 3 are front and side views, respectively, showing the optical system of a first embodiment of the stereomicroscope according to the present invention. In these figures, reference numeral 11 represents an objective lens for collimating rays of light emanating from an object surface; 12 an imaging lens for imaging parallel rays emerging from the objective lens 11; and 13 a Porro prism (image erecting optical system) disposed on the emergence side of the imaging lens 12, comprising three prisms 13a, 13b, and 13c for erecting an image. The rays incident on the Porro prism 13 are first reflected by the prism 13a to change their direction, and after being twice-reflected by the prism 13b, further reflected by the prism 13c toward an eyepiece 14. The eyepiece 14 has an optical axis common to the imaging lens 12 and is provided with a variable magnification optical system for magnifying the image to be formed, the eyepiece comprising an eye lens 14a, moving lens units 14b and 14c shifting along the optical axis, and a fixed lens unit 14d, in which the moving lens units 14b and 14c are each moved from the position of the solid line to that of the broken line indicated by an arrow Y in FIG. 3, thereby varying magnification. With such an arrangement, all the components ranging from the objective lens 11 to the eyepiece 14 have an optical axis in common and the effective diameter of the eye lens 14a is greater than the viewer's interpupil distance, so that a viewer's eyes 15 looking through the eyepiece 14 assume the role of an optical system for setting the pupils for stereoscopic vision. In the figures, lines 0–0 denotes an objective optical axis and symbol I an image point.

Because the first embodiment is constructed as mentioned above, when the viewer looks at an object from the eyepiece 14, the directions in which the object is observed with individual eyes differ and thus parallax is produced with the resultant stereoscopic vision of the image. Additionally, due to the fact that the effective diameter of an eye lens 14a is larger than the viewer's interpupil distance, the exit pupil becomes larger than the interpupil distance to increase the degree of freedom of the eyepoint, the problems, such as disappearance and eclipse of the image involved by the shift of the eyepoint, are hard to occur, and the image can be observed in a free posture. Since the use of the variable magnification optical system of the single lens makes it hard to produce the difference in magnification between the images observed with the individual eyes, the image is easy to see, which situation is effective for lessening the fatigue of the eyes during the observation.

The Porro prism 13, comprised of three separated prisms, allows the optical axis to be inclined at any angle. Specifically, when the objective optical axis between the prisms 13a and 13b is taken as a first rotary axis A and that between the prisms 13b and 13c as a second rotary axis B so that the prisms 13b and 13c are rotated about the first and second rotary axes A and B, respectively, at a rotating angle ratio of 1:2, the inclination angle of the optical axis for observation connecting the center of the object surface and that of the viewer's pupils can be changed without causing any inverted image. Hence, the degree of freedom in the direction of observation is increased, and if the inclination angle of the optical axis is adjusted so as to cause the observation direction to approach a horizontal position, the eyepoint can be located near the working position, along with the reduction of the entire length of the objective optical system due to the arrangement that the eyepiece is provided with the variable magnification optical system, and the work efficiency in observation can be improved.

Figure 4:
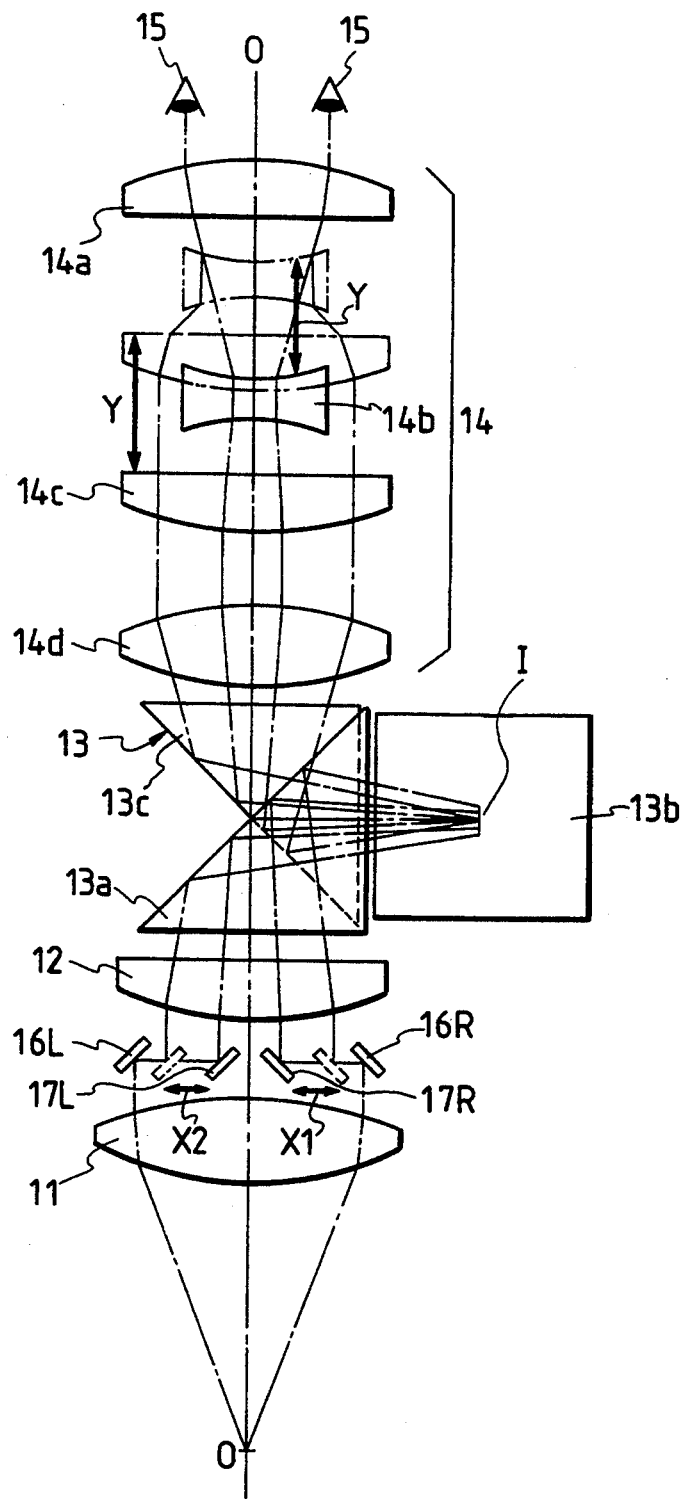
FIG. 4 is a front view showing the optical system of a second embodiment of the stereomicroscope according to the present invention.

FIG. 4 shows a front view of the optical system of a second embodiment, which comprises of the objective lens 11 for collimating rays of light emanating from the object surface; fixed mirrors 16R and 16L and movable mirrors 17R and 17L for changing heights from the objective optical axis, of parallel rays emerging from the objective lens 11; the imaging lens 12 for imaging the parallel rays reflected from respective mirrors; the Porro prism 13 disposed on the emergence side of the imaging lens 12, including the three prisms 13a, 13b, and 13c for erecting the image; and the eyepiece 14 equipped with the variable magnification optical system for magnifying an erected image and the eye lens 14a configured so that its effective diameter is greater than the viewer's interpupil distance for observation of the image with the eyes, in which all optical components ranging from the objective lens 11 to the eyepiece 14 have an optical axis in common. In the figure, line 0–0 represents the objective optical axis; symbol I the image point; and arrows X1 and X2 the directions of movements of the movable mirrors 17R and 17L, respectively.

The Porro prism 13 has the configuration and function similar to those in the first embodiment so that the inclination angle of the optical axis for observation can be changed to convert arbitrarily the direction for observation. The eyepiece 14 also has the configuration and function similar to those in the first embodiment so that each of the moving lens units 14b and 14c is shifted from the position of the solid line to that of the broken line indicated by the arrow Y in the figure, thereby varying magnification.

Figure 5:
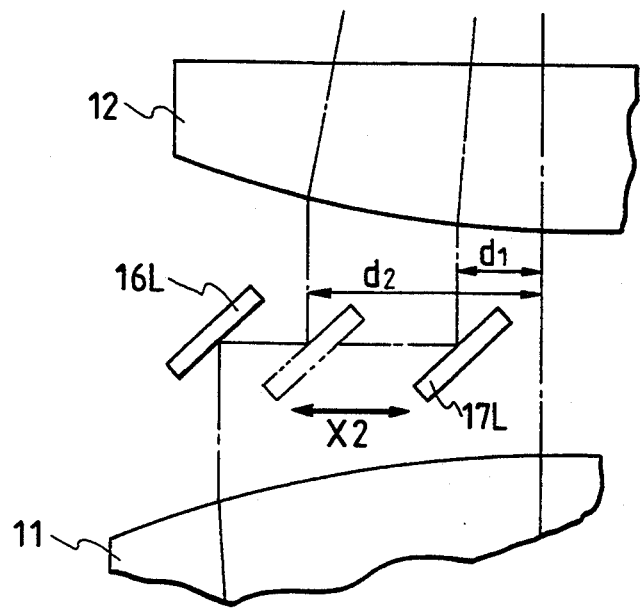
FIG. 5 is a view for explaining the state of the shift of a movable mirror in the second embodiment.

The movable mirrors 17R and 17L are disposed in the vicinities of the positions conjugate with those of the viewer's pupils and associated with the magnification change of the variable magnification optical system to shift, perpendicular to the objective optical axis, by equal distance therefrom. When the magnification is made to vary from $\beta 1$ to $\beta 2$, the ray height, namely, the distance between the objective optical axis and the observation optical axis changes from d1 to d2 according to the movement of the movable mirrors 17R and 17L (see FIG. 5). This relation is expressed by $$d1/\beta 1 = d2/\beta 2 \tag{1}$$

Since the second embodiment is designed as mentioned above, the internal inclination angles of the rays emanating from the object surface, incident on the objective lens 11, are corrected to be always constant even when the magnification is varied by the movements of the movable mirrors 17R and 17L. The image can thus be observed and remains unchanged in stereoscopic sensibility and is easy to see over the whole range of the magnification change. Further, with the aid of the arrangement that the effective diameter of the eye lens 14a is greater than the viewer's interpupil distance, the exit pupil distance becomes larger than the interpupil distance to increase the degree of freedom of the eyepoint, so that the direction for observation can be adjusted by the Porro prism 13 and the image can also be observed in any posture whatever. The optical system consisting of the fixed mirrors 16R and 16L and the movable mirrors 17R and 17L, for changing the heights of the parallel rays from the objective optical system may well be provided between the eye lens 14a of the eyepiece 14 and the viewer's eyes 15.

Figure 6:
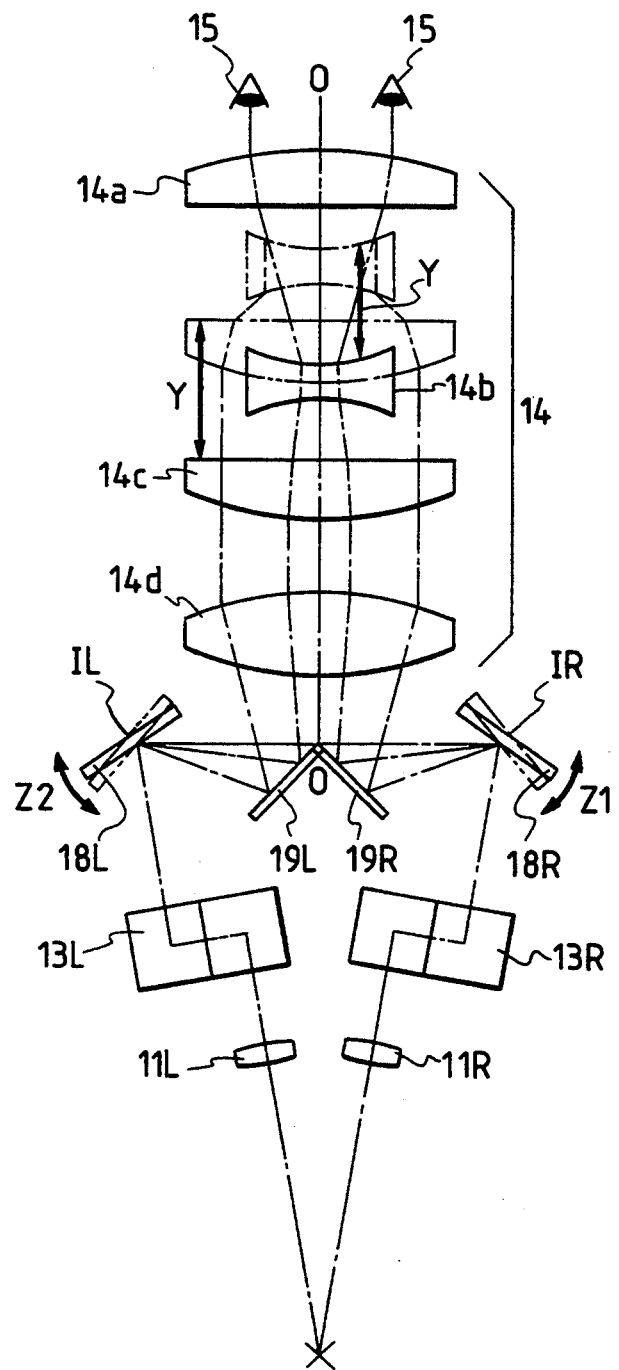
FIG. 6 is a front view showing the optical system of a third embodiment of the stereomicroscope according to the present invention.

FIG. 6 shows a front view of the optical system of a third embodiment, which comprises a pair of objective lenses 11R and 11L with bilateral symmetry; Porro prisms 13R and 13L for forming rays of light emanating from the objective lenses 11R and 11L into erected images; rotary mirrors 18R and 18L disposed adjacent to image planes IR and IL of the objective lenses 11R and 11L, turning at a rotating angle of symmetry; fixed mirrors 19R and 19L for conducting reflected light from the rotary mirrors to the eyepiece 14; and the eyepiece 14 provided with the variable magnification optical system for magnifying the images conducted by the fixed mirrors and the eye lens 14a whose effective diameter is larger than the viewer's interpupil distance to observe the images with the eyes. In the exit pupils on both sides at the eye lens 14a, a pupil distance and pupil diameters are set so as to suit any viewer. If, preferably, the distance between the centers of both pupils is set at about 65 mm and the pupil diameter at 15 mm or more, problems will not be produced. The eyepiece 14 has the same configuration and function as in the first and second embodiments and the magnification is varied by shifting each of the moving lens units 14b and 14c from the position of the solid line to that of the broken line indicated by the arrow Y. In the figure, arrows Z1 and Z2 denote the directions of rotations of the rotary mirrors 18R and 18L.

Figure 7:
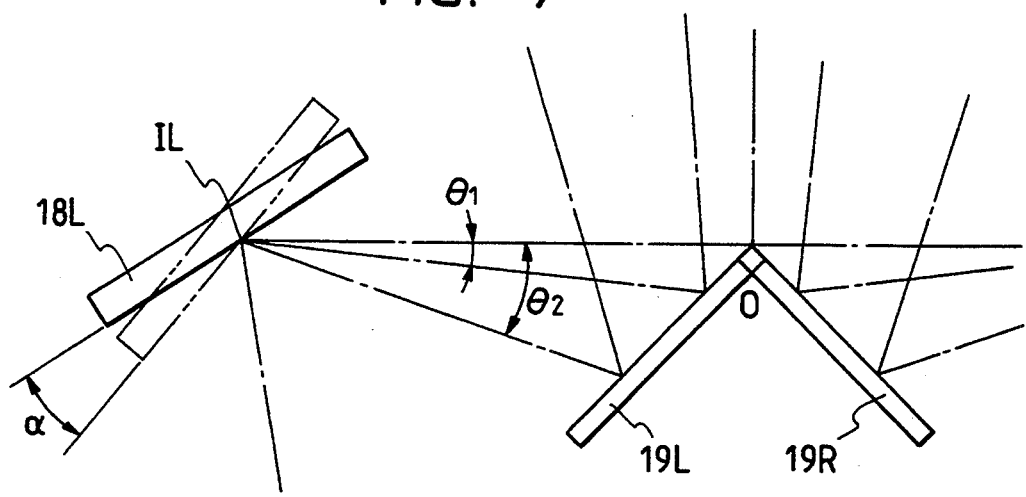
FIG. 7 is a view for explaining the state of the rotation of a rotary mirror in the third embodiment.

Extensions O-IR and O-IL bent by the fixed mirrors 19R and 19L from the objective optical axis O—O are called ocular optical axes. When the magnification is $\beta 1$, each of the angles made by the ocular optical axes O-IR and O-IL with the observation optical axes at the objective image planes IR and IL is represented by $\theta 1$ (see FIG. 7). In this state, it is assumed that the rotary mirrors 18R and 18L are adjusted so that the image any viewer sees with his eyes is not eclipsed. When each of angles made by the ocular optical axes O-IR and O-IL with the observation optical axes where the magnification changes to $\beta 2$ is represented by $\theta 2$ and the rotating angle of each of the rotary mirrors 18R and 18L by $\alpha$ (see FIG. 7), the rotary mirrors 18R and 18L rotate at the angle $\alpha$ and thereby the reflected light obliques by an angle $2\alpha$. That is, $$\theta 2 = \theta 1 + 2\alpha \qquad (2)$$

On the other hand, the relationship between the magnification is given by $$\beta 2/\beta 1 = \sin \theta 2 / \sin \theta 1 \qquad (3)$$

The substitution of Eq. (2) in Eq. (3) in terms of the rotating angle $\alpha$ then yields $$\alpha = \frac{1}{2} \sin^{-1}\left(\frac{\beta 2}{\beta 1} \sin \theta 1\right) - \frac{\theta 1}{2} \qquad (4)$$

When $\theta 1$ (rad) $<<1$ and $\theta 2$ (rad) $<<1$, Eq. (4) can be approximated by $$\alpha = \frac{1}{2} \frac{\beta 2 - \beta 1}{\beta 1} \theta 1 \qquad (5)$$

Hence, in the arrangement of the third embodiment described above, the magnification of the variable magnification optical system of the eyepiece 14 and the rotating angle $\alpha$ of the rotary mirrors 18R and 18L are set while maintaining the relation of Eq. (4) or (5), thereby allowing the eclipse of the image attributable to the magnification change to be prevented and a fair image to be observed over the whole range of the magnification change. Since, in general, the angles made by the ocular axes with the observation axes are small, the rotating angle $\alpha$ can be approximated by Eq. (5). Further, setting both exit pupils at the eye lens 14a so as to suit any viewer eliminates the troublesome operation that the distance between the exit pupils must be adjusted each time the viewer changes, increases the degree of freedom of the eyepoint, and enables the image to be observed in any posture, with the result that it is effective for improving work efficiency in observation and for lessening the fatigue of the viewer.

The optical system which has been mentioned above can also be applied to Greenough and Galilean stereomicroscopes if the optical systems adjacent to the eyepiece are changed. In most of the Galilean stereomicroscopes in particular, constituent elements are united so that the elements, such as the imaging lens, the Porro prism, and the eyepiece, can be integrally removed. Thus, if the elements of the optical system stated in each embodiment are united and replaced by parts of the conventional stereomicroscope, it is possible to achieve the effect of the present invention with the microscope body of the conventional arrangement.

What is claimed is:

1. A stereomicroscope comprising:
    an objective lens for converting light from an object into substantially parallel beams of light;
    an imaging lens receiving emergent light from said objective lens, for forming an image of the object at a predetermined position;
    means for erecting said image of the object; and
    an eyepiece for observing said image of the object, said image of the object being viewed stereoscopically when a viewer looks through said eyepiece with his eyes,
    wherein said eyepiece is equipped with, in order from the side of said image of the object, a variable magnification optical system and an eye lens and constructed from a single lens system common to the eyes of the viewer,
    said eye lens having a diameter greater than an interpupil distance of the viewer,
    optical paths from said object image to the eyes of the viewer traversing positions outside an optical axis of said eyepiece.

2. A stereomicroscope according to claim 1, wherein said means for erecting said image of the object is a Porro prism, said Porro prism being constructed from three triangle prisms separated from one another.

3. A stereomicroscope according to claim 1, wherein said objective lens and said imaging lens are each constructed from a single lens system common to the eyes of the viewer and disposed to coincide in optical axis with said eyepiece,
    optical paths from said image of the object to the eyes of the viewer traversing positions outside the optical axis of each of said objective lens and said imaging lens.

4. A stereomicroscope according to claim 2, wherein means for changing a distance between said optical paths from said object through said image of the object to the eyes of the viewer is disposed midway of said optical paths.

5. A stereomicroscope according to claim 3, wherein said means for changing a distance between said optical paths is moved in response to an operation of varying magnification of the variable magnification optical system of said eyepiece so that internal inclination angles of said optical paths are maintained constant on object.

* * * * *